US007752569B2

(12) United States Patent
Schultz et al.

(10) Patent No.: US 7,752,569 B2
(45) Date of Patent: Jul. 6, 2010

(54) SOFTWARE KEY LABELING ON SOFTWARE KEYBOARDS

(75) Inventors: Tracy D. Schultz, Bellevue, WA (US); Lindsey R. Noll, Seattle, WA (US); Judy C. Tandog, Seattle, WA (US); Michael J. Hone, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 11/222,906

(22) Filed: Sep. 9, 2005

(65) Prior Publication Data

US 2007/0061750 A1    Mar. 15, 2007

(51) Int. Cl.
G09G 5/00 (2006.01)
G06F 15/02 (2006.01)
G06F 3/00 (2006.01)
G06F 3/048 (2006.01)

(52) U.S. Cl. .................. 715/773; 345/156; 345/168; 708/142; 708/131; 708/140; 715/703; 715/780

(58) Field of Classification Search .................. 341/22, 341/26; 345/156, 168; 361/680; 708/142, 708/131, 140; 715/773, 703, 780
See application file for complete search history.

(56) References Cited

U.S. PATENT DOCUMENTS

| | | | | | |
|---|---|---|---|---|---|
| 5,128,672 | A | * | 7/1992 | Kaehler | 341/23 |
| 5,329,609 | A | * | 7/1994 | Sanada et al. | 704/251 |
| 5,594,640 | A | * | 1/1997 | Capps et al. | 715/235 |
| 5,671,378 | A | * | 9/1997 | Acker et al. | 715/801 |
| 5,717,425 | A | * | 2/1998 | Sasaki | 345/157 |
| 5,818,437 | A | * | 10/1998 | Grover et al. | 715/811 |
| 5,952,942 | A | * | 9/1999 | Balakrishnan et al. | 341/20 |
| 6,295,052 | B1 | * | 9/2001 | Kato et al. | 345/179 |
| 6,307,548 | B1 | * | 10/2001 | Flinchem et al. | 715/811 |
| 6,310,608 | B1 | * | 10/2001 | Kaply et al. | 345/168 |
| 6,437,709 | B1 | * | 8/2002 | Hao | 341/23 |
| 6,724,370 | B2 | | 4/2004 | Dutta et al. | |
| 7,113,177 | B2 | * | 9/2006 | Franzen | 345/173 |
| 7,133,030 | B2 | * | 11/2006 | Bathiche | 345/170 |

(Continued)

FOREIGN PATENT DOCUMENTS

CN    1641538(A)    7/2005

(Continued)

OTHER PUBLICATIONS

Guan et al., "Designing a Dual Page Virtual Keyboard for Mental Speller", May 2005.*

(Continued)

Primary Examiner—William L Bashore
Assistant Examiner—David Phantana-angkool
(74) Attorney, Agent, or Firm—Lee & Hayes, PLLC

(57) ABSTRACT

In an embodiment, a software keyboard includes a software key with a first label and a second label, where both the first and the second label are visible. The first label may be displayed on the software key so as to indicate that the first label is active. In an embodiment, the user may provide an input so as to make the second label active and the change may be indicated on the software key. In an embodiment, the arrangement of the first and second labels may be adjusted in response to a resizing of the software keyboard.

9 Claims, 13 Drawing Sheets

U.S. PATENT DOCUMENTS

| | | | | |
|---|---|---|---|---|
| 7,170,429 B2* | 1/2007 | Koppich | | 341/23 |
| 7,319,743 B1* | 1/2008 | Dunlap | | 379/93.01 |
| 7,403,190 B2* | 7/2008 | Bathiche | | 345/170 |
| 7,554,529 B2* | 6/2009 | Kotipalli | | 345/168 |
| 2002/0156615 A1 | 10/2002 | Takatsuka et al. | | |
| 2003/0197627 A1* | 10/2003 | Botich | | 341/22 |
| 2004/0104896 A1* | 6/2004 | Suraqui | | 345/168 |
| 2004/0119751 A1* | 6/2004 | Yoshimi et al. | | 345/773 |
| 2005/0251752 A1* | 11/2005 | Tan et al. | | 715/741 |
| 2006/0132447 A1* | 6/2006 | Conrad | | 345/168 |

FOREIGN PATENT DOCUMENTS

| | | | |
|---|---|---|---|
| JP | 2002-297293 A | | 10/2002 |
| JP | 2002297293 A | * | 10/2002 |

OTHER PUBLICATIONS

International Search Report for International Application No. PCT/US2006/034860, Feb. 5, 2007, 13 pages.

* cited by examiner

SOFTWARE KEY LABELING ON SOFTWARE KEYBOARDS

BACKGROUND

The use of software keyboards on computers with displays has proven helpful. For example, many portable computers do not have sufficient space to provide a physical keyboard. While it is possible to use an external physical keyboard, for user of portable computers it is often undesirable to carry around an external keyboard because doing so would vitiate part of the benefit of having a portable computer in the first place.

While other methods exist, however, often a keyboard is the most effective means of entering data. Therefore, software keyboards have been used as a way to provide the user with a method of entering data and/or writing on, for example, portable PC's.

Given the limited amount of space available on the display, however, often the software keyboard will assign more than one label to a single software key. Current software keyboards generally display one label at a time on each software key and require the user to select a modifier key such as selecting a SHIFT key in order to see what other labels are associated with a particular software key. This can make it difficult for an individual to quickly use the software keyboard. This problem is exacerbated in a situation where the keyboard is being used by a person familiar with keyboards based on another language. For example, the English keyboard associates the selection of "SHIFT" and "2" with the label "@" while the Italian keyboard associates the "@" label with the "SHIFT" and ";" keys. Thus, the English keyboard associates the "2" label and the "@" label with a key while the Italian keyboard associates the "@" label and the ";" label with a different key. This can cause confusion to the user.

As noted above, some software keyboards associate multiple labels with a single software key. For example, the English keyboard typically associates two labels with each software key. Some languages, such as East Asian languages, may associate more labels with a key. While the English keyboard simply requires a shift to see the other labels associated with the software key, a software keyboard configured for an East Asian language such as Japanese might require selecting a "SHIFT" key, a "ALT" key or an "CTRL" key in combination with another key to access all the labels associated with that particular key. As the number of labels associated with the software key increases it becomes more difficult for the user to effectively use the software keyboard. Therefore, current software keyboards do not meet the needs of some users.

SUMMARY

A software keyboard includes a number of software keys. One of the software keys may include a first label and a second label. The first label may be active and the second label may be inactive and the software key may indicate that the first label is active. In response to an input, the second label may become active instead of the first label and the change in which label is active may be indicated on the software key. If the software keyboard is resized, then an arrangement of the labels on the software key may be adjusted to account for the change in size of the software keyboard. In an example, if the software key is reduced enough in size, then the inactive label may be blanked so that the active label can use the entire size of the software key to be displayed.

BRIEF DESCRIPTION OF THE DRAWINGS

The present invention is illustrated by way of example and not limited in the accompanying figures in which like reference numerals indicate similar elements and in which.

DETAILED DESCRIPTION

It is noted that various connections are disclosed herein. Unless otherwise noted, these connections may be direct, indirect, wired or wireless and this disclosure is not intended to be limiting in this regard.

For ease of understanding, this detailed description is split into the following sections: Computer Background; and Labels on Software Keyboards.

Computer Background

The foregoing description provides an embodiment within which the present invention may be used. However, the present invention is not so limited and this disclosure is not intended to be limiting with respect to the computer hardware or software utilizing the present invention.

Figure 1:
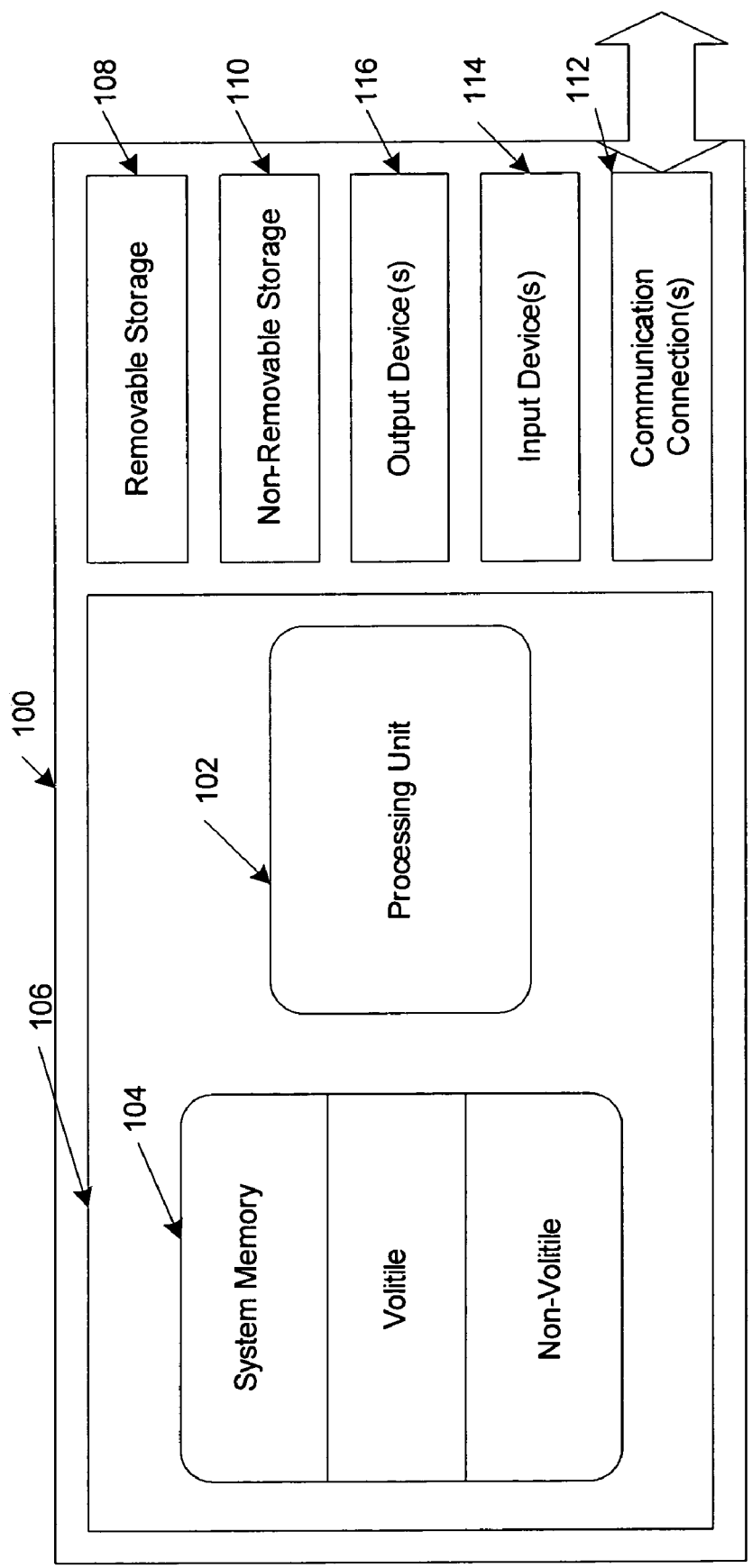
FIG. 1 illustrates an exemplary embodiment of a computer system in accordance with an aspect of the present invention.

With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Figure 2:
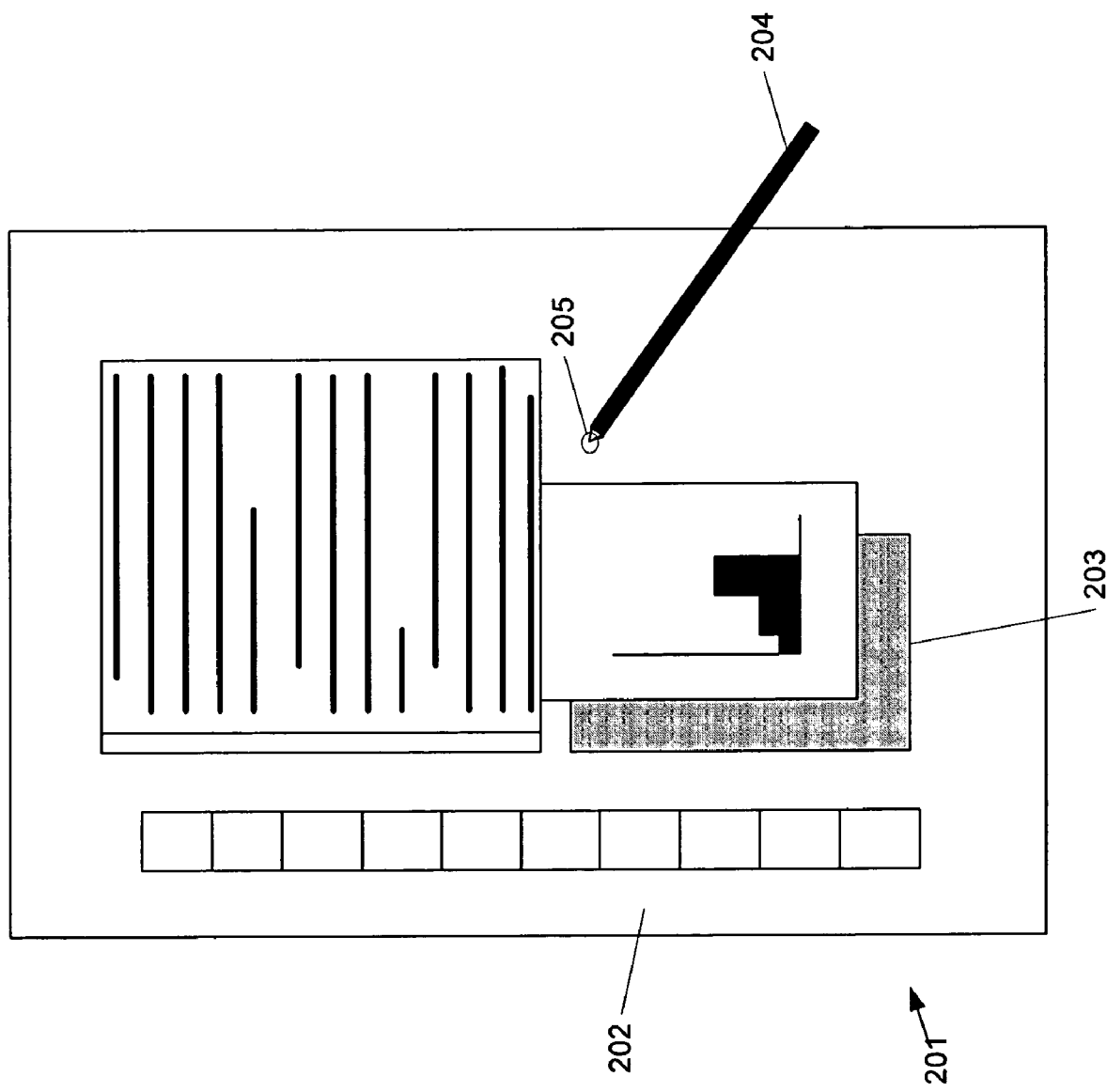
FIG. 2 illustrates an exemplary embodiment of a Tablet PC in accordance with an aspect of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Labels on Software Keyboards

The use of labels on software keys in a software keyboard allows a user to input data so as to create and edit written content. For some languages, the user has a variety of formats to write in, thus making the exercise of writing more complicated. For example, the Japanese language includes several different formats, each with its own set of characters. One of the formats, Kanji, includes almost more than 10,000 different characters, of which 2000-3000 are regularly used. To provide a software keyboard that associates a label for each character to a different key would be impracticable, thus methods of allowing the user to enter the characters based on the context and possible meaning of each character have been developed. For example, input method editors (IME) exist and may control the labels visible on the software key depending on which format the user is using and what actions the user has previously taken. Thus, it should be noted that in addition to the user being able to provide inputs that change the active and/or visible label, software such as the IIME may also provide inputs that change the label(s) visible and/or active on a software key.

Figure 3:
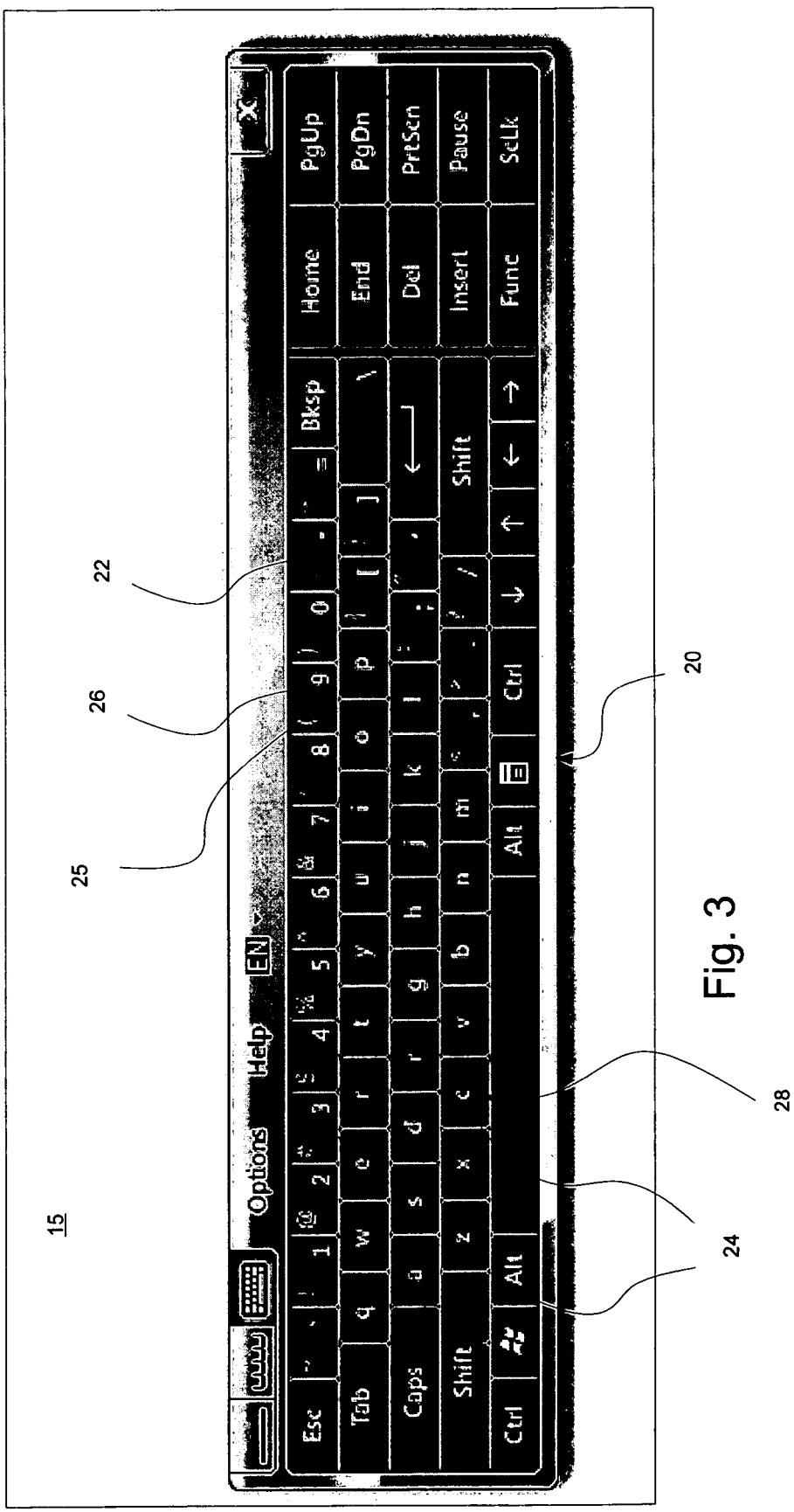
FIG. 3 illustrates an exemplary embodiment of a software keyboard in accordance with an aspect of the present invention.
Figure 4:
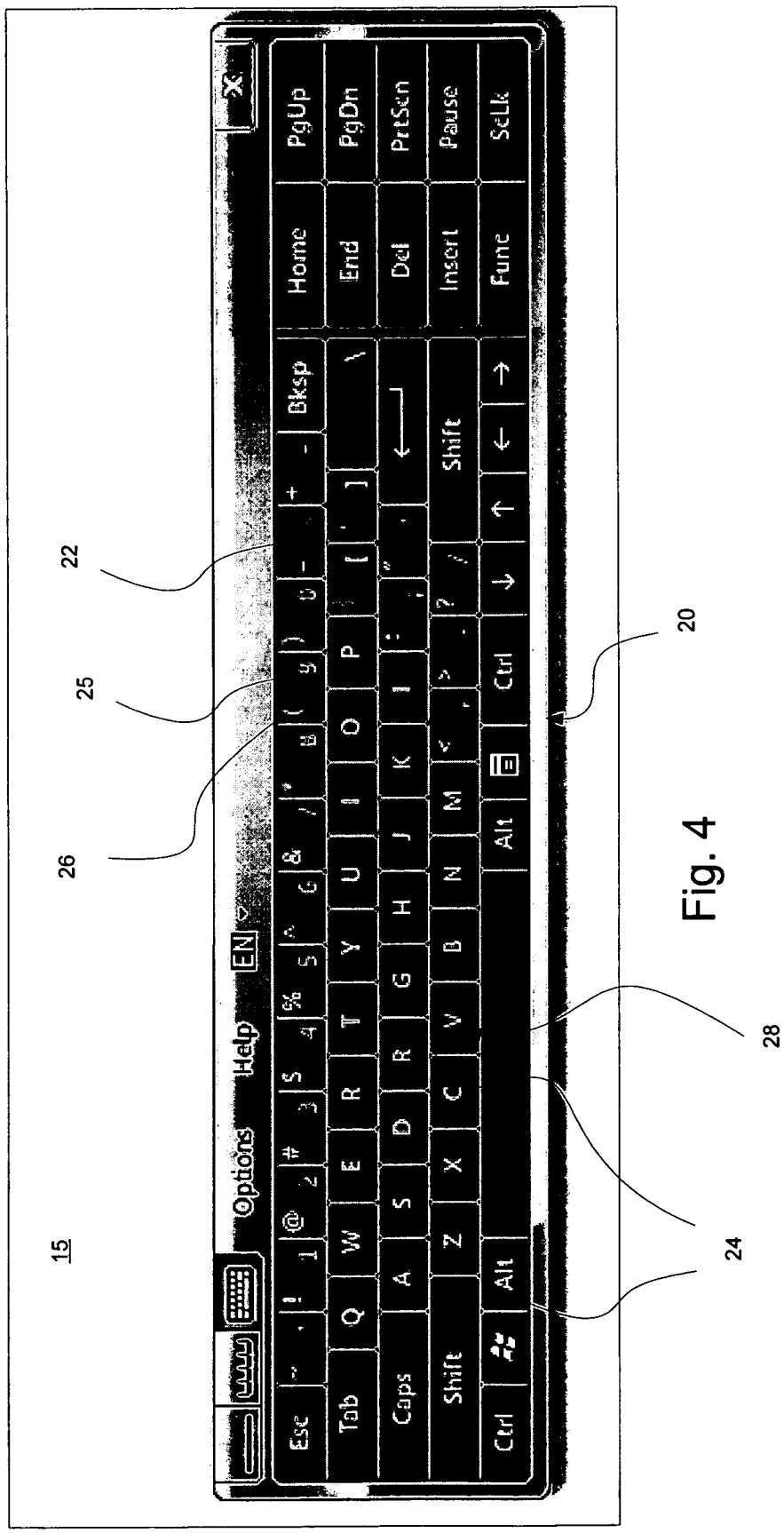
FIG. 4 illustrates the software keyboard depicted in FIG. 3 with the SHIFT key selected in accordance with an aspect of the present invention.

Looking first at FIGS. 3-6, several illustrations of possible software keyboards 20 with software keys 22 that include labels 24 are depicted. In general, the particular shape and color of the software keyboard 20 and software keys 22 may be varied based on aesthetic determinations. It should be noted that the software keyboards 20 in FIGS. 3 and 4 are smaller than the software keyboards 20 in FIGS. 5 and 6. In an embodiment, the smaller software keyboards 20 may be reduced size versions of the larger keyboards 20. In an alternative embodiment, the smaller software keyboards 20 are not based on the larger keyboards 20. These software keyboards 20 will be further discussed below.

Before continuing, however, as noted above, certain languages include multiple formats for writing. For example, the Japanese language, in addition to having Kanji, also includes two basic character sets, Hiragana and Katakana. In an embodiment, the labels 24 may be the characters representing the Hiragana and Katakana formats. Thus, in an embodiment, selecting an appropriate modifier key will can change whether the Hiragana or Katakana labels are active. Furthermore, if one format is active, in an embodiment both formats may be displayed. Thus, in an embodiment the active labels would be representative of Hiragana characters and the inactive labels would be representative of Katakana characters.

It should be noted that modifier key may be defined as any key affecting the state of the keyboard. As an example, one common modifier key is the SHIFT key.

Figure 7A:
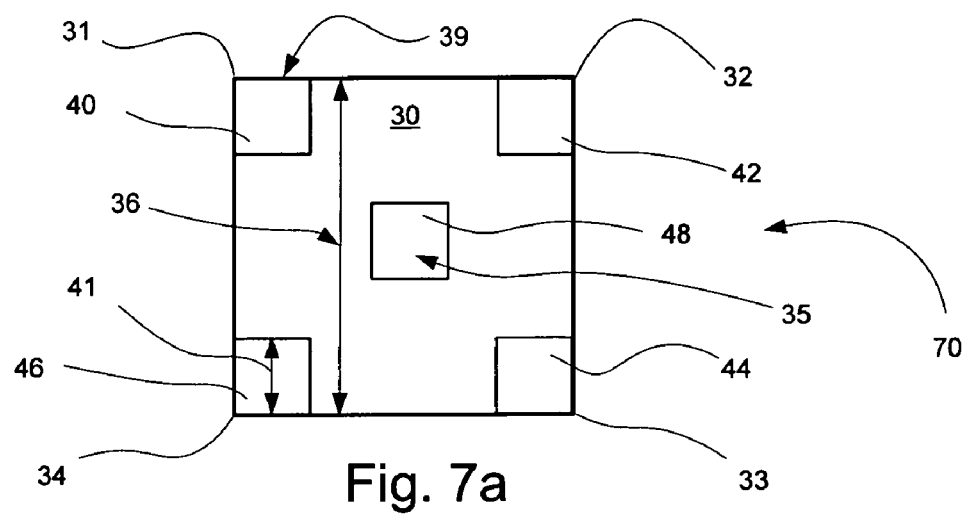
FIGS. 7a illustrates an embodiment of a software key with an exemplary arrangement in accordance with an aspect of the present invention.

Turning to FIG. 7a, an embodiment of a software key 30 is depicted. The software key 30 includes a first corner 31, a second corner 32, a third corner 33 and a fourth corner 34 about a center 35. As depicted, the software key 30 has a length 36 that is the same in both the vertical and horizontal direction. Thus, a perimeter 39 of the software key 30 is square shaped. It should be noted that in an embodiment the software key 30 may be some other shape, such as rectangular or having varying non-linear shaped perimeter 39. For ease of discussion, however, the perimeters 39 of the software keys 30 described in FIGS. 7a-9b are depicted as having the same length 36 in the vertical and horizontal directions. In other words, the software keys 30 depicted in FIGS. 7a-9b are square.

As depicted in FIG. 7a, a first label 40, a second label 42, a third label 44, a fourth label 46 and a fifth label 48 are provided on the software key 30. It should be noted that, depending on the size of the label 40 and the software key 30, additional labels may be provided on the software key 30. However, providing too many labels tends to clutter the software key 30 and therefore may be less helpful to the user.

It should be noted that the labels may be any type of symbol desired, such as, alphanumeric characters, ASCII symbols, Roman characters, Chinese characters, and Japanese characters. Thus, as can be appreciated, any type of symbol that may be displayed on a display may be a label. While any symbol may be a label, certain symbols are more complex than others and therefore may be difficult to discern if provided in a font that is too small. Therefore, while not required, different types of symbols may have different minimum font sizes, depending on the size and resolution of the display. In an embodiment, the most complex symbol may set the minimum font size that may be used for the entire software keyboard. In an alternative embodiment, the minimum size of each label may be determined on a symbol by symbol basis or a software key by software key basis. In an alternative embodiment, some combination of an individual and a group setting of the label font size may be used.

As depicted, the labels 40, 42, 44, 46 and 48 are also depicted as having a length 41 that is the same in the vertical and horizontal direction. In other words, while not so limited, the labels are depicted as being square. In addition, while not required, the labels 40, 42, 44, 46, and 48 are all depicted as being the same size. For ease of discussion, all the labels on the software keys 30 depicted in FIGS. 7a-8b are the same size as the other labels, if applicable, that are on the same software key 30. As will be discussed below, however, this is not required.

As can be appreciated, the first label 40 is located in the first corner 31, the second label 42 is located in the second corner 32, the third label 44 is located in the third corner 33, the fourth label 46 is located in the fourth corner 34 and the fifth label 48 is located in the center 35. The location and the configuration of the various labels forms an arrangement 70. As will be discussed below, the arrangement 70 may be adjusted.

As depicted, the length 41 of the labels is less than 25 percent of the length 36 of the software key 36. While such a proportion is not required, it should be noted that it may be helpful to have some space around the labels so as to make the various labels easier to read. Thus, a software key 30 with five labels as depicted in FIG. 7a should generally have a length 36 that is at least three times the length 41 if all the labels have the same length and overlapping of the labels is undesired.

Figure 5:
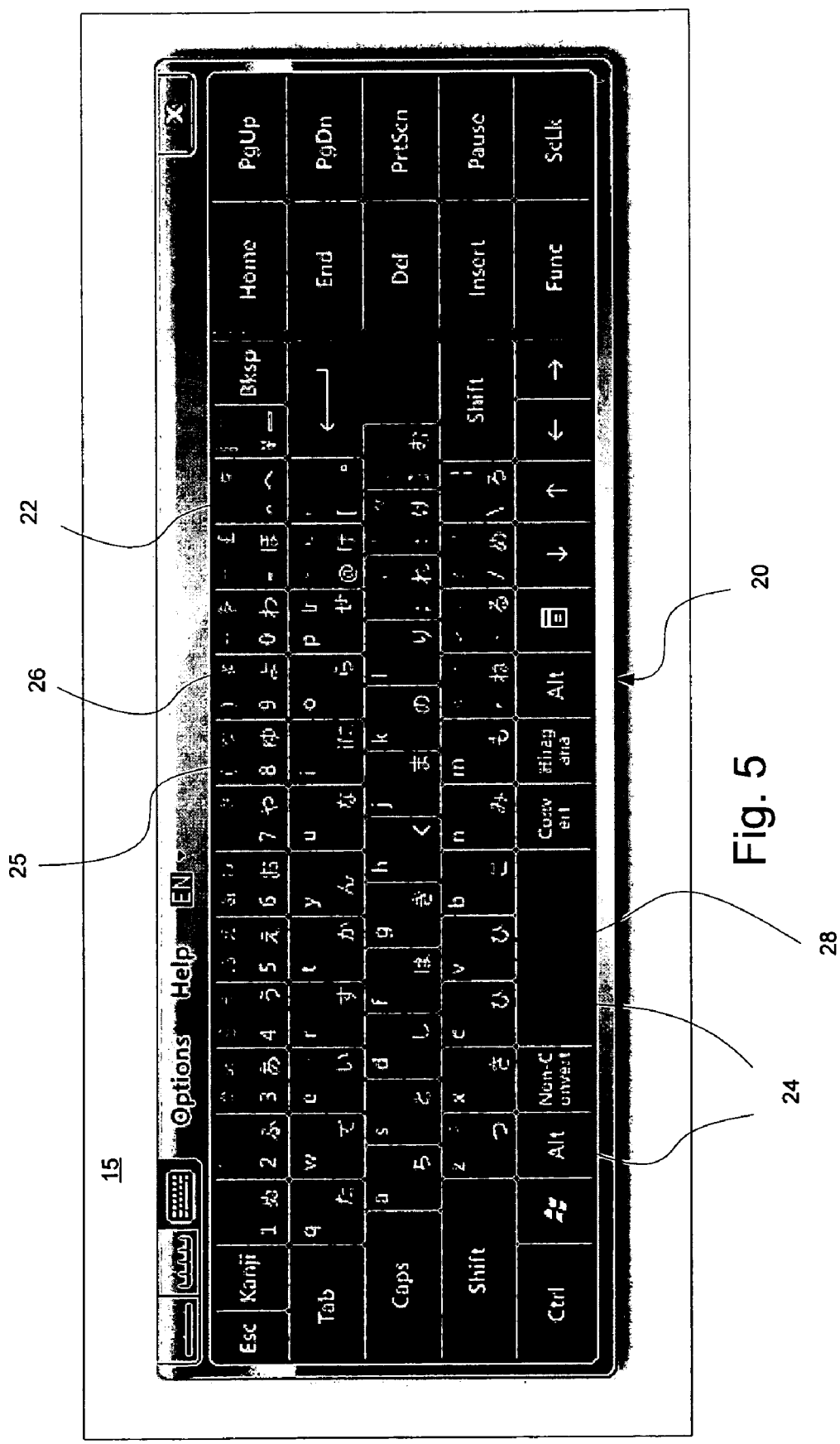
FIG. 5 illustrates an exemplary embodiment of a software keyboard in accordance with an aspect of the present invention.
Figure 6:
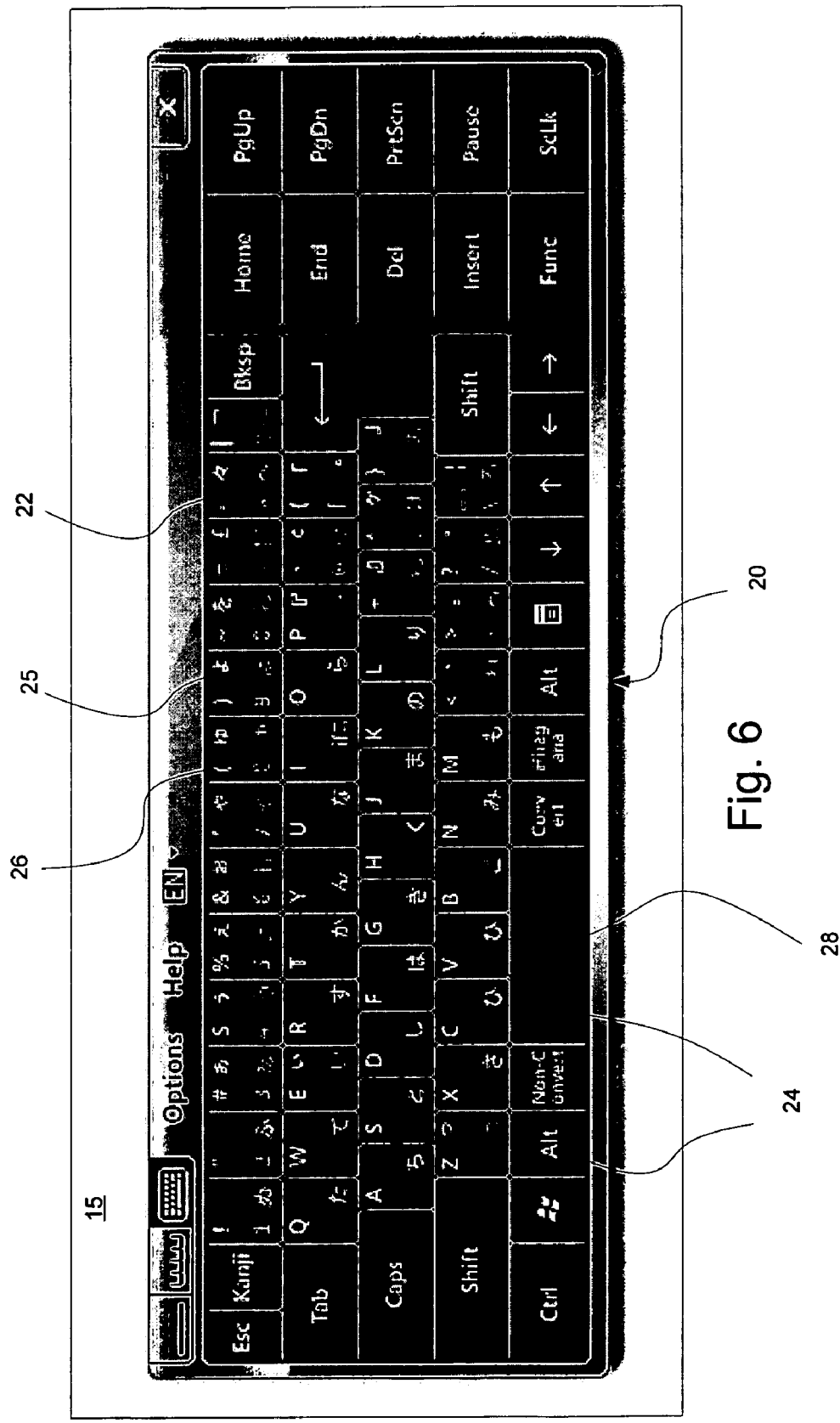
FIG. 6 illustrates the software keyboard depicted in FIG. 5 with the SHIFT key selected in accordance with an aspect of the present invention.

It should be noted that any one of the labels could be considered the active label, thus it is helpful to indicate which label is the active label. This is where a software keyboard may have an advantage over physical keyboards. As more than one label may be provided on the software key 30, the active label may be made slightly larger than the inactive labels, may be made a brighter or somehow be highlighted with the use of additional or different colors. Other methods of indicating the active label (not shown), such as but not limited to, underlining, moving the label to the center of the software key or enclosing the label in a box, may also be used. It should also be noted that more than one label may be active at one time, as illustrated in FIGS. 5 and 6.

Figure 7B:
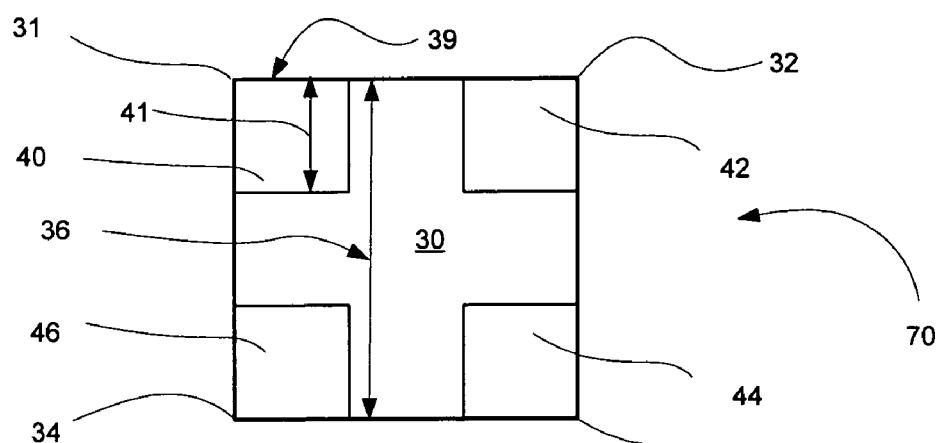
FIG. 7b illustrates an embodiment of a software key with an alternative exemplary arrangement in accordance with an aspect of the present invention.

Turning to FIG. 7b, the arrangement 70 has been adjusted. Adjusting the arrangement, as used herein, refers to one or more of the following: a change in the position of at least one of the labels on the software key 30, a change in the font size of at least one of the labels, and/or a change in the percentage of visible labels (e.g. a blanking or unblanking of at least one of the labels). Thus, in an embodiment, the percentage of visible labels that are displayed will be reduced when the length 36 of the software key 30 is decreased.

As depicted in FIG. 7b, the software key 30 no longer includes the label 48 depicted in FIG. 7a. Thus, the length 36 of the software key 30 may be reduced in comparison to the length 41 of the labels 40, 42, 44 and 46. Thus, looking at the transition between FIG. 7a and FIG. 7b, if the length 36 of the software key 30 is smaller in FIG. 7b than in FIG. 7a and the length 41 is kept constant, then one method of adjusting the arrangement 70 in response to the change in the size of the software key 30 is to decrease the number of labels being displayed on the software key 30. Therefore, in an embodiment, the adjustment in the arrangement 70 will cause the blanking of one or more labels (e.g. the blanking of the fifth label 48).

Figure 7C:
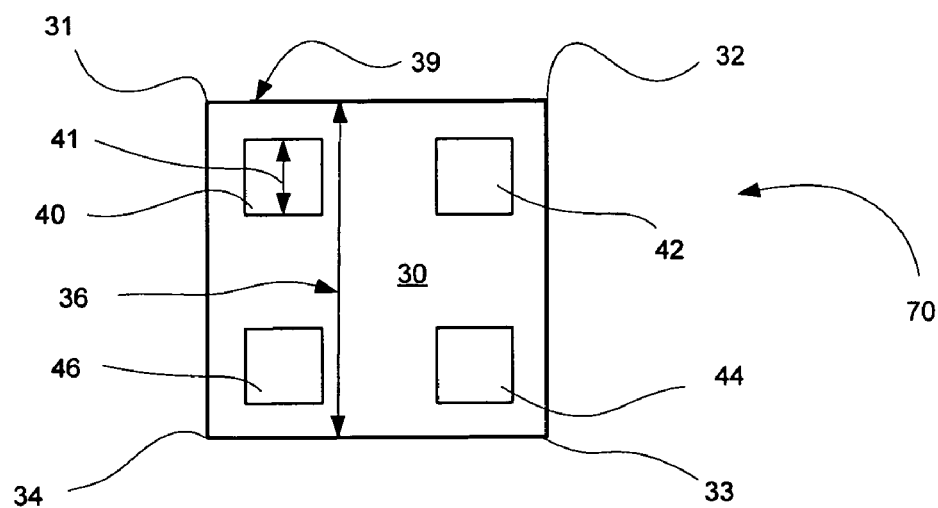
FIG. 7c illustrates an embodiment of a software key with an alternative exemplary arrangement in accordance with an aspect of the present invention.

Turning to FIG. 7c, an alternative arrangement of the software key 30 is depicted. As illustrated, the software key 30 of FIG. 7c has the same length 36 as the software key 30 in FIG. 7b; however, the length 41 of the labels has decreased. Thus, FIG. 7c illustrates an alternative embodiment of adjusting the arrangement 70 where the font size of the labels 40, 42, 44 and 46 is decreased. As can be appreciated, numerous variations in adjusting the location, the percentage of visibility and/or the font size may be implemented as desired.

Figure 8A:
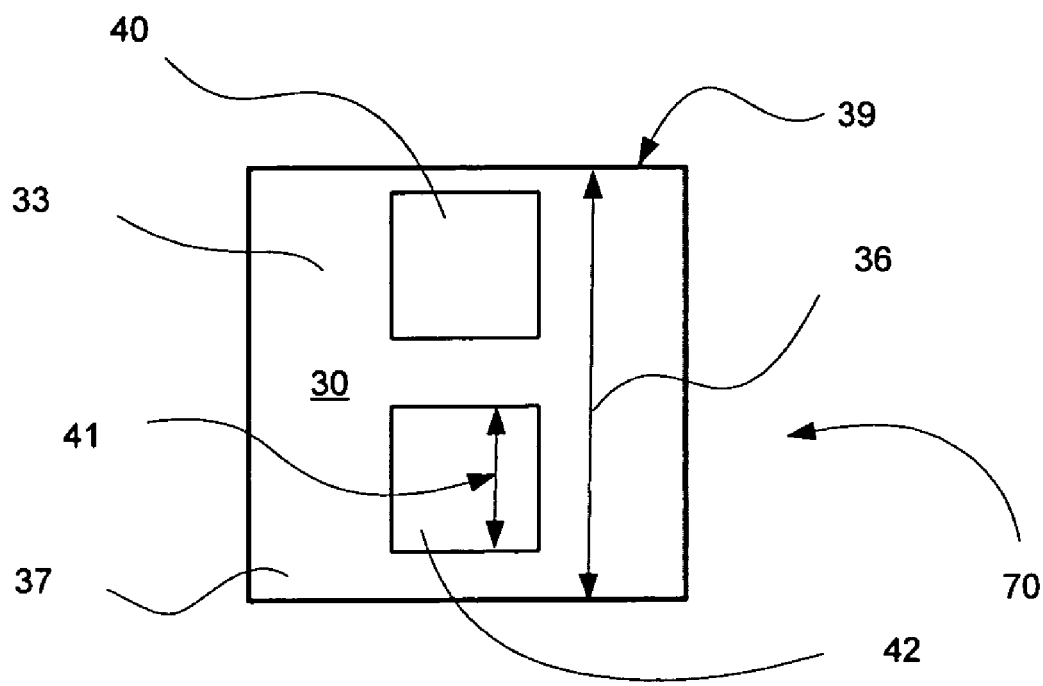
FIG. 8a illustrates an embodiment of a software key with an alternative exemplary arrangement in accordance with an aspect of the present invention.

Turning to FIG. 8a, the software key 30 is depicted with the length 36 further reduced and the percentage of labels that are visible being reduced. In an embodiment, the number of labels that are associated with the software key 30 is still five (as with the software key depicted in FIG. 7a), however, due to the reduced length 36 of the software key 30 only the first label 40 and the second label 42 are displayed. Thus, labels 44, 46 and 48 are blanked. It should be noted that while depicted in as being vertically aligned, in an alternative embodiment (not shown) the labels 40, 42 could also be located in the first corner 31 and third corner 33. Numerous variations in how the labels may be positioned on the software key 30 are possible.

Figure 8B:
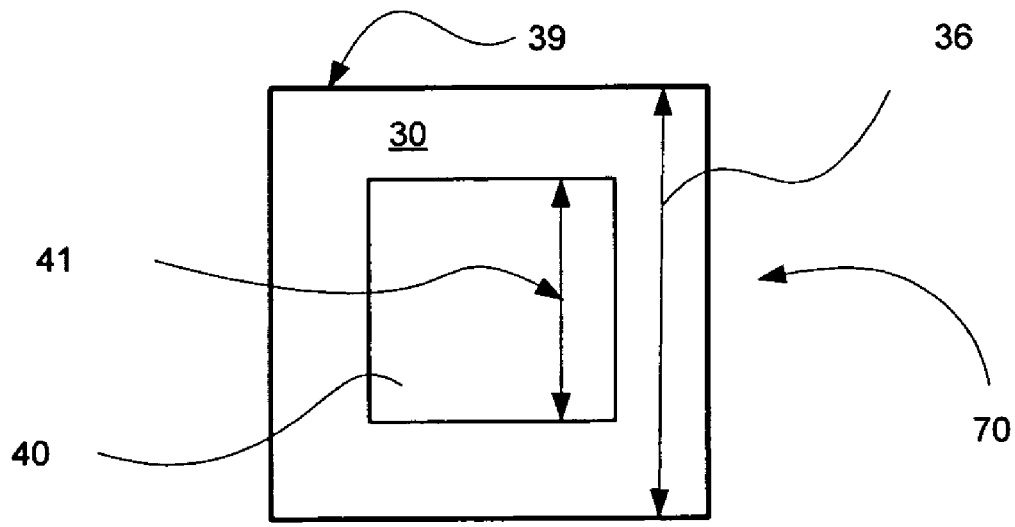
FIG. 8b illustrates an embodiment of a software key with an alternative exemplary arrangement in accordance with an aspect of the present invention.

Looking next at FIG. 8*b*, the length 36 of the software key 30 is further reduced. Thus, only the first label 40 is depicted as being visible and the other labels are blanked. It should be noted that further reductions in the length 36 of the software key 30, as depicted in FIG. 8*b*, may require the length 41 of the label 40 to be reduced. Thus, reductions in the size of the length 36 of the software key 30 eventually require a reduction in the length 41 of the label 40 (e.g. a reduction in the font size of the label 40). At some point, further reductions in the length 41 of the label 40 would cause the label 40 to be so small as to be illegible and therefore it may be useful to impose a lower limit on the length 36 of the software key 30 and the corresponding length 41 of the label 40.

Figure 9A:
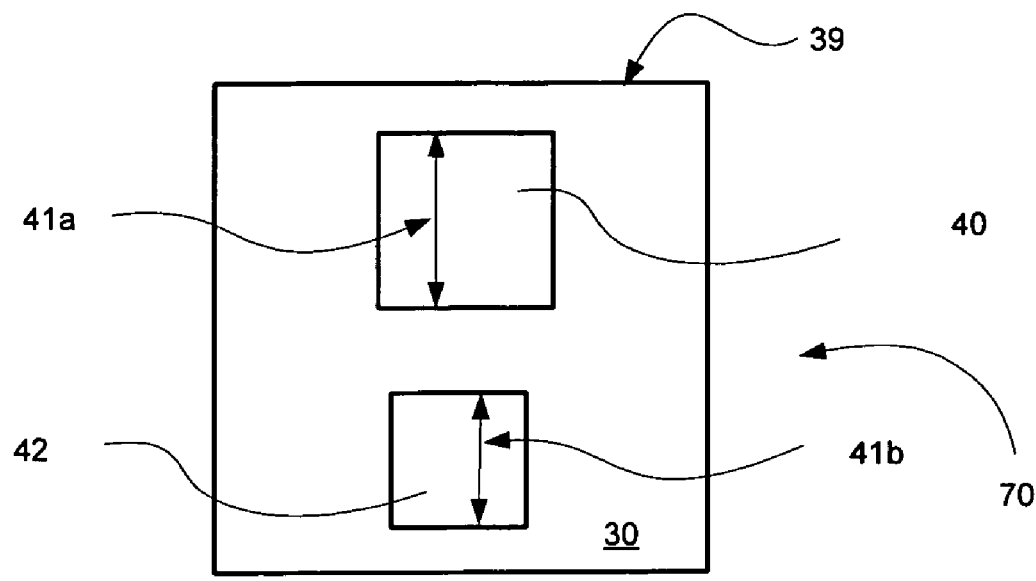
FIG. 9a illustrates an embodiment of a software key with an alternative exemplary arrangement in accordance with an aspect of the present invention.
Figure 9B:
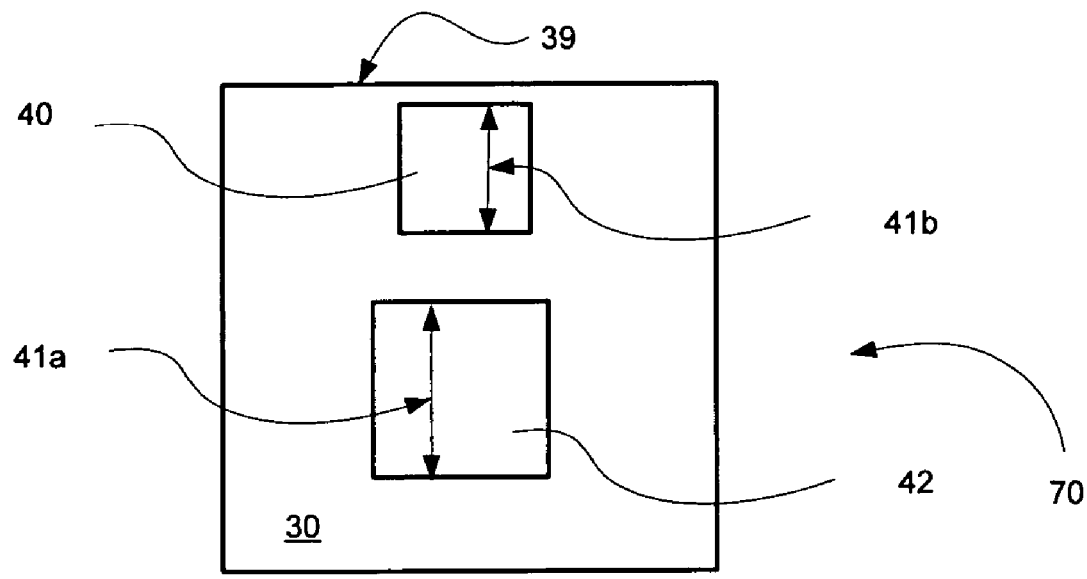
FIG. 9b illustrates an embodiment of a software key with an alternative exemplary arrangement in accordance with an aspect of the present invention.

As noted above, numerous variations in how the labels may be configured to indicate the active label are possible. FIGS. 9*a* and 9*b* illustrate an embodiment where the active label has a greater length 41 than the inactive label. Thus, when label 40 is active it has a length 41*a* that is greater than the length 41*b* of the label 42. However, as depicted, when label 42 is active it has a length 41*a* that is greater than the length 41*b* of label 40. In an embodiment the user may provide an input so as to switch the active labels. Thus, FIGS. 9*a*-9*b* illustrate an alternative embodiment of a method of adjusting the arrangement 70.

Looking back at FIGS. 3-6, as can be appreciated, the software keyboard 20 includes a plurality of software keys 22 with a plurality of labels 24. As can be appreciated, the labels 24 have a font size 28 and the entire software keyboard 20 is provided on a display 15. As can be appreciated, some of the software keys include at least one active label 26 and at least one inactive label 25. As depicted, selecting the "SHIFT" key, which is a modifier key, can change which label 24 is active on a particular software key 22. In an embodiment, as depicted in FIGS. 3, 4, certain keys such as the key with the label "a" may be configured to only display the active label. Thus the switch between states will cause a switch between the "A" label and the "a" label for that key. While this is not required, as many users are very familiar with upper and low case Roman letters, they may find such a configuration effective.

As depicted, the size of the software keyboard 20 may also have an impact on the number of labels 24 displayed (e.g. visible) and the number of labels 24 that are blanked. In an embodiment, FIGS. 3 and 4, which may be considered reduced size versions of FIGS. 5 and 6, may include software keys 22 with lower percentages of labels 24 visible as compared to FIGS. 5 and 6. Of course, certain software keys 22 may only have one label 24 associated with them. For example, the space key typically has a single label 24 associated with because the user may still want to provide a space regardless of which set of labels 24 is active (e.g. regardless of what state the software keyboard 20 is in).

Figure 10:
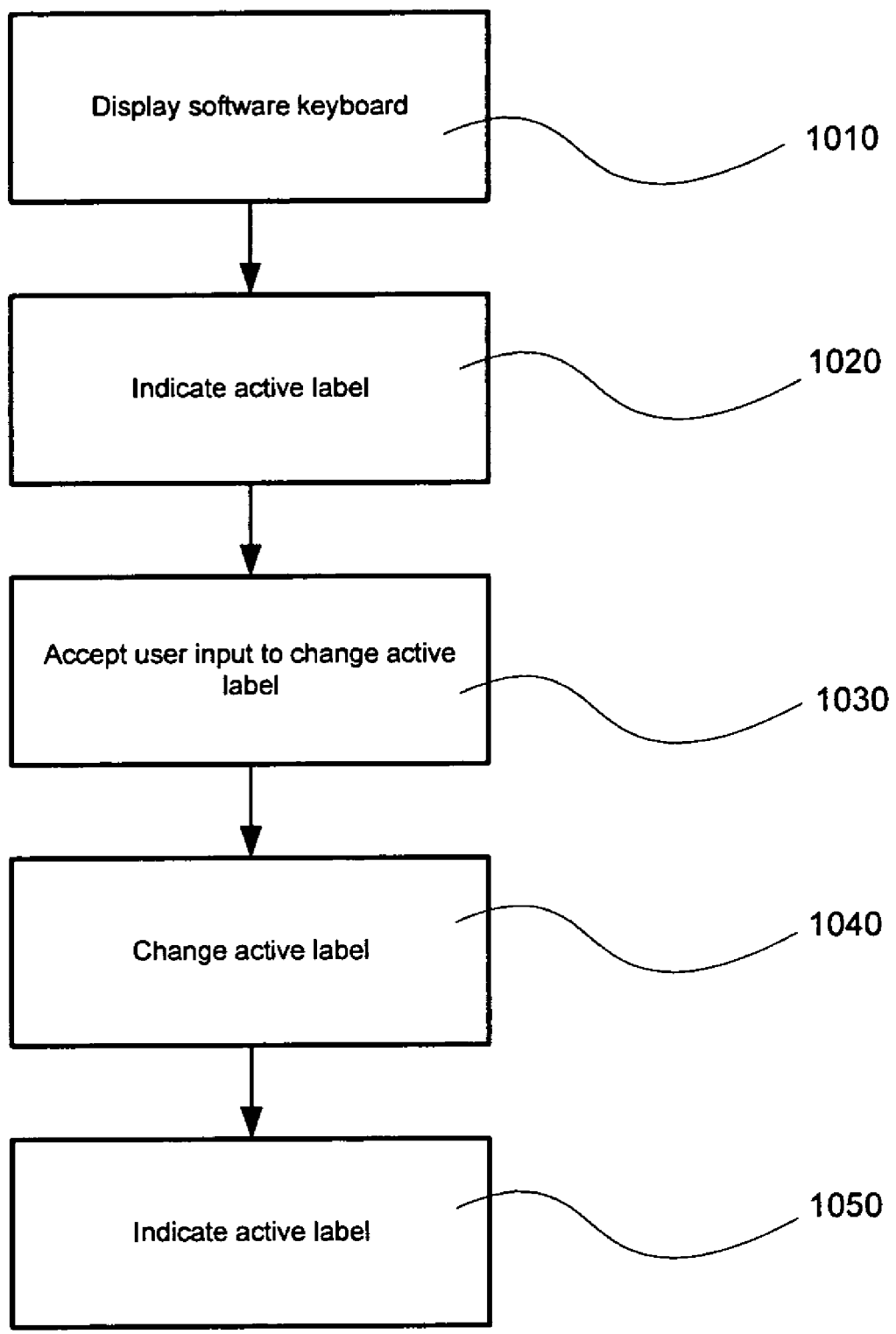
FIG. 10 illustrates an exemplary method of indicating the active label on a software key in accordance with an aspect of the present invention.

Turning to FIG. 10, an embodiment of a method of displaying labels 24 on software keys 22 is depicted. First in step 1010, a software keyboard 20 is displayed on a display, the software keyboard 20 including a plurality of software keys 22. At least one of the software keys 22 includes at least two visible labels 24. In step 1020 the active label 26 is indicated. This may be accomplished by diminishing the brightness of the inactive label 25. In an embodiment, step 1010 and step 1020 may be combined. It should be noted that in an embodiment, the software keyboard 20 may be too small to allow multiple labels 24 to be displayed.

Next in step 1030, a signal is received from the user to switch the active label 26. In an embodiment, the signal is provided by activating a SHIFT key or some other modifier key. In steps 1040 and 1050, the active key 26 is switched and the switch is indicated on the display. Thus, FIG. 10 illustrate a method of allowing a user to visually determine which label 24 is active and further allows the user to visually see if the attempt to switch the active label 26 was successful. It should be noted that while at least one software key 22 may include at two labels, one or more software keys may only have one label.

Figure 11:
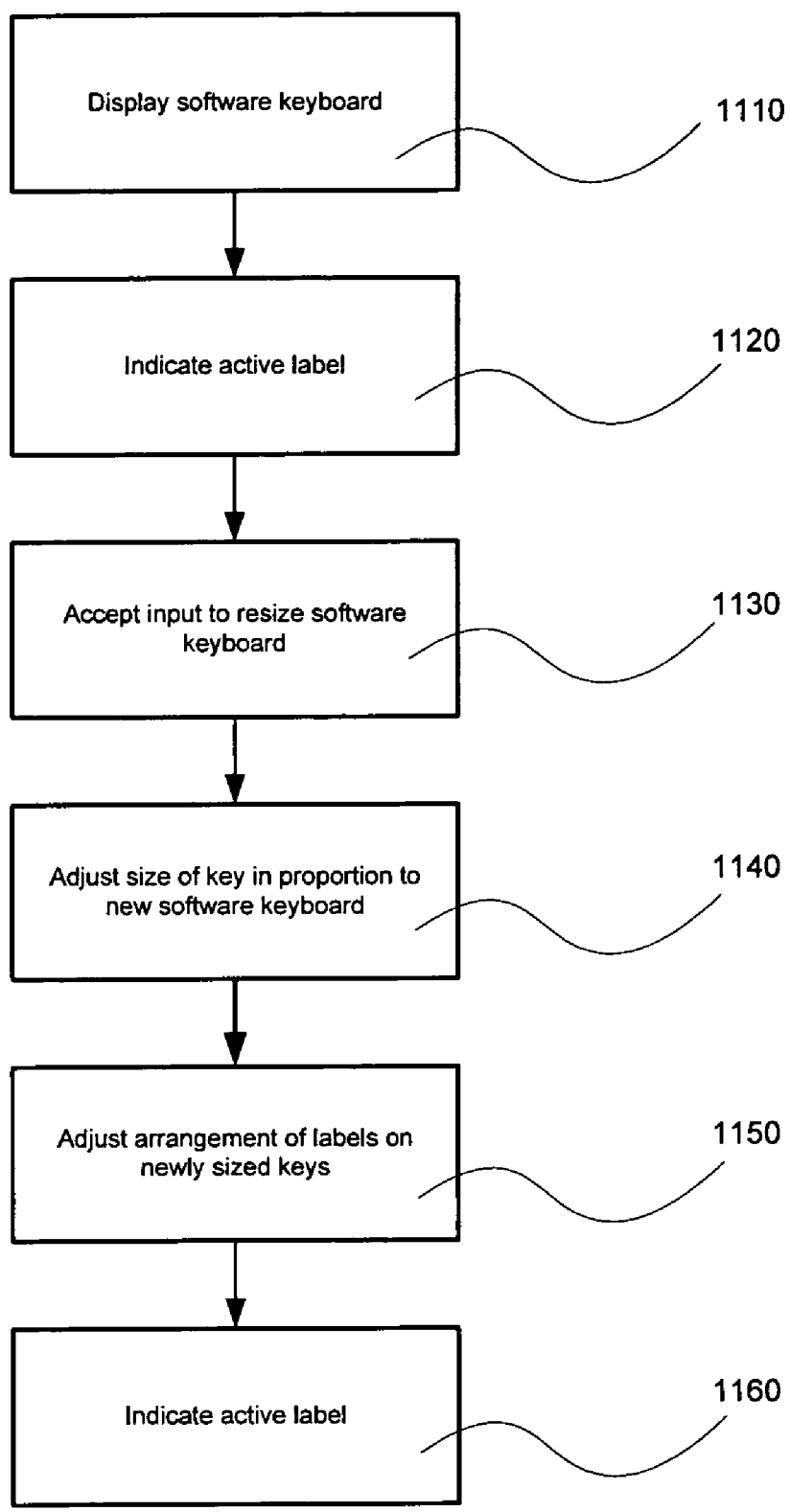
FIG. 11 illustrates an exemplary method of resizing a software keyboard in accordance with an aspect of the present invention.

Looking next at FIG. 11, an embodiment of a method of adjusting an arrangement 70 is provided. First in step 1110 the software keyboard 20 is displayed on a display 15, the software keyboard 20 including at least one software key 22 with at least two visible labels 24. Next in step 1120, the active label 26 on the software key 22 is indicated.

Next in step 1130, a signal or input is provided to resize the software keyboard 20. In an embodiment this may be provided by the user making a selection or changing the software keyboard 20 size via known window resizing techniques. Next in step 1140, the size of the software key 22 is adjusted to fit the new keyboard 20 size. In an embodiment the change in the size of the software key 22 may be proportional to the change in the size of the software keyboard 20. In an embodiment, a change in the size of the software keyboard 20 may cause more or less software keys 22 to be visible.

In step 1140 the arrangement of labels is adjusted to take into account the new software key 22 size and in step 1150, if needed, the active label 26 is indicated. Naturally, if only one label 24 is visible because the size of the keyboard has been reduced, the visible label 24 will be the active label 26. However, in an embodiment, at least one software key 30 may have at least two labels 245 visible at the smallest size of software keyboard 20 allowed so that an active label 26 and an inactive label 25 are visible.

Figure 12:
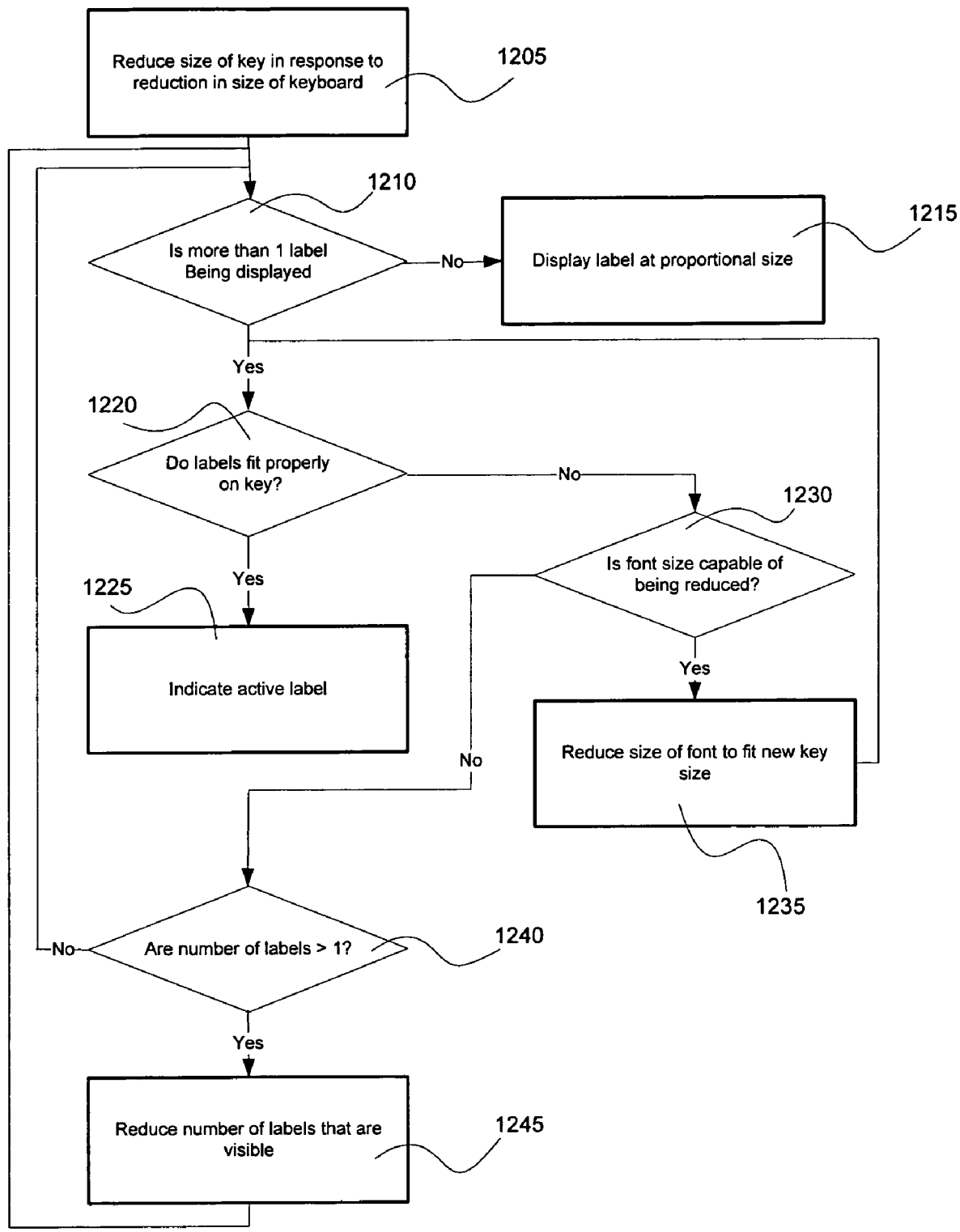
FIG. 12 illustrates an exemplary method of adjusting an arrangement on a software key in accordance with an aspect of the present invention.

Turning next to FIG. 12, an embodiment of a method for adjusting the arrangement 70 is provided. First in step 1205, the size of the software key 22 is reduced to correspond to a reduced size of the software keyboard 20. Then in step 1210 a check is made to see if more than one label 24 is being displayed. If only one label 24 is being displayed, then in step 1215 the label 24 is displayed in an appropriate proportional size, taking into account, as desired, any limits to the size of the label 24 and the size of the software key 22.

If more than one label 24 is visible on the software key 22, then in step 1220 a check is made to see if the labels 24 will properly fit on the new size of the software key 22. This may be done, for example, by comparing the length 36 (FIG. 7*a*) of the software key 22 to the length 41 (FIG. 7*a*) of the label 24 to verify there is a certain proportional difference. It should be noted that in an embodiment, this step may involve an algorithm for determining how to arrange the labels 24 on the software keys 22.

If the labels 24 will fit appropriately as is, then in step 1225 the active label 26 is indicated and the method is complete. In the alternative, if the labels 24 will not fit, in step 1230 a check is made to see if the font size of the labels 24 may be reduced. It should be noted that this will always be answered yes if there is no lower limit on the font size of the label 24. If the font size may be reduced, then in step 1235 the font size is reduced and the check in step 1220 is repeated.

If the font size may not be further reduced, then in step 1240 a check is made to see if the number of visible labels 24 is greater than one. It should be noted that a counter may be used instead of the number of variables. In an embodiment, the counter might have two or three possible values such as low, medium and high that correspond to the number of labels 24 that are displayed on all the software keys 22 on the software keyboard 20. In such an embodiment, if the counter value was medium or high than it would be possible to switch to a lower value. Thus, in an embodiment, all the software keys 22 may be treated similarly. However, in an alternative embodiment, a check on an individual software key 22 basis may also be made. In another alternative embodiment, a combination of individual and groups of software keys 22 may be handled as appropriate.

If the number of labels 24 may be reduced, then in step 1245 one or more labels 24 are blanked. Then step 1210 is repeated and if more than one label 24 is still being shown, step 1220 is also repeated as discussed above. It should be noted that the while the blanking in step 1245 is done after the font size is reduced in step 1235, in an alternative embodiment the blanking may be done first and then the font size may be reduced. In another embodiment, first the font size may be reduced, then a label 24 may be blanked, then the font size may be further reduced, and then another label 24 may be blanked. Thus, as can be appreciated, flexibility exists in how the method of adjusting the arrangement 70 is handled.

It should be noted that in an embodiment, the method disclosed in FIG. 12 can also be applied, albeit in a reverse manner, to increasing the size of the software key 22 and software keyboard 20. In addition, variations in the order of steps may be made. Furthermore, additional steps may be added and other steps may be omitted as needed. Thus, the embodiments of methods disclosed may be combined as needed to provide the desired method.

Figure 13:
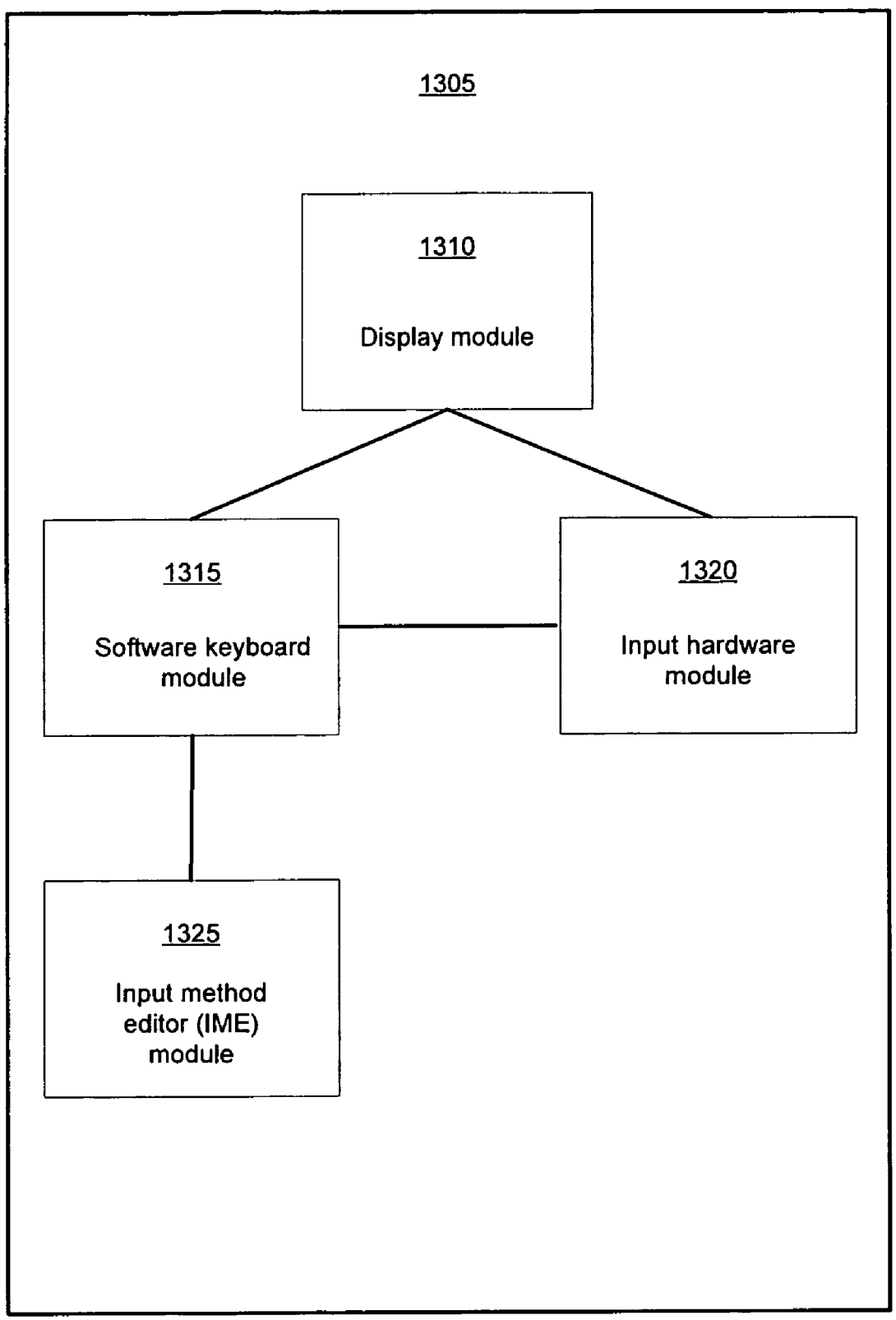
FIG. 13 illustrates a schematic representation of various components of a computing device in accordance with an aspect of the present invention.

Turning to FIG. 13, a schematic of a computing device 1305 that may be used in accordance with an aspect of the present invention is illustrated. Before discussing the computing device 1305 in further detail it should be noted that the term module refers to a functional rather than a physical boundary, thus the same software or hardware may perform more than one of the functions discussed below. It should be further noted that additional connections may be provided between the various modules as desired.

The computing device 1305 includes a display module 1310. A software keyboard module 1315 is connected to the display module 1310 and controls the look of a software keyboard 20 (FIG. 3-6) on the display module 1310. In addition, an input hardware module 1320 is depicted connected to the display module 1310 and to the software keyboard module 1315. The input hardware module 1320 may include, but is not limited to, one or more of the following: a mouse, a touch pad, a pressure sensitive display, a physical keyboard and a switch. Thus, the input hardware module 1320 may provide input to the display module 1310 and the software keyboard module 1315.

In an embodiment, the input hardware module 1320 may be the physical keyboard and pressing a key on the physical keyboard will cause the same key to be pressed on the software keyboard displayed on the display module 1310. Thus, pressing a modifier key such as the SHIFT key on the physical keyboard will change the state of the software keyboard. As can be appreciated, this allows the user to use a physical keyboard while being better able to discern what label is active. It should be noted that changing the state of the software keyboard will change the active label of at least one software key.

The software keyboard module 1315 is also depicted connected to an input method editor (IME) module 1325. Thus, the software keyboard module 1315 may also receive input from an IME module 1325 that may affect the look of the software keyboard 20. In an embodiment, the input provided by the IME module 1325 may be related to which labels 24 (FIG. 3) are active. In response to the input, the software keyboard module 1315 may adjust how the software keyboard is displayed on the display 1305. For example, as noted above, the Japanese language includes Hiragana and Katakana characters. In an embodiment, the IME module 1325 may provide a signal to the software keyboard module 1315 to switch the active labels from Hiragana to Katakana. In an embodiment, whether the inactive labels were visible would depend on the size of software keyboard. It should be noted that in an alternative embodiment the IME module 1325 may be omitted.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. In a computer system having a graphical user interface including a display and a user interface selection device, a method of providing and displaying a software keyboard, comprising the steps of:
   (a) providing a software key in the software keyboard on the display;
   (b) displaying an arrangement of a plurality of labels on the software key, wherein the displaying the arrangement of the plurality of labels comprises:
      (i) displaying a first label, a second label, a third label and a fourth label on the software key,
      (ii) positioning the first label in a first corner, positioning the second label in a second corner, positioning the third label in a third corner, and positioning the fourth label in a fourth corner;
   (c) resizing the software keyboard in response to user input; and
   (d) rearranging the plurality of labels in response to the resizing of the software keyboard to make the plurality of labels visible to a user, wherein the rearranging in comprises:
      (i) blanking the third and the fourth label; and
      (ii) positioning the first label on a first half and positioning the second label on second half.

2. The method of claim 1, wherein the software key includes a center and the plurality of labels includes a first label and the displaying in (b) comprises:
   (i) moving the first label to the center of the software key to indicate the first label is active.

3. The method of claim 1, wherein the rearranging in (d) comprises:
   (i) changing a font size of at least one of the plurality of labels on the software key.

4. The method of claim 1, wherein the rearranging in (d) comprises:
   (i) changing a percentage of the plurality of labels that are visible on the software key.

5. A computer-readable storage medium having computer-executable instructions for performing steps comprising:
   (a) displaying a set of labels on a software key in a software keyboard in a first arrangement, the set of labels including a first label and a second label, wherein the first label is an active label of the software key that it labels, and wherein the software key, when utilized, effectuates an action which corresponds to the active label, and wherein the first and second labels are displayed simultaneously on the software key;
(b) highlighting the active label;
(c) accepting an input to switch the label from the first label to the second label;
(d) switching the activity level of the first and second label;
(e) highlighting the active label;
(f) accepting a user selection of the software key;
(g) accepting an input to resize the software keyboard;
(h) adjusting a size of the software key in proportion to the resized software keyboard;
(i) rearranging the set of labels on the adjusted size key; and
(j) displaying the set of labels on the key in a second arrangement, the second arrangement changing the number of labels visible on the software key.

6. The computer executable code of claim 5, further comprising the step of:
(k) repeating (c)-(e).

7. The computer executable code of claim 5, further comprising the step of:
(k) displaying the set of labels on the key in a second arrangement, the second arrangement adjusting the font size of the first and second label.

8. The computer executable code of claim 5, wherein the highlighting in (b) comprises:
(i) decreasing a level of illumination of the label that is not active.

9. The computer executable code of claim 5, wherein the accepting the input in (c) comprises:
(i) receiving the input from an input method editor.

* * * * *